United States Patent
Lin et al.

(10) Patent No.: US 8,854,840 B2
(45) Date of Patent: Oct. 7, 2014

(54) METHOD AND APPARATUS TO IMPROVE DYNAMIC RESPONSE OF THE SYNCHRONOUS RECTIFYING FOR RESONANT POWER CONVERTERS

(75) Inventors: Tien-Chi Lin, Taipei County (TW);
Ying-Chieh Su, Taipei County (TW);
Chou-Sheng Wang, Keelung (TW)

(73) Assignee: System General Corporation, Sindian, Taipei County (TW)

( * ) Notice: Subject to any disclaimer, the term of this patent is extended or adjusted under 35 U.S.C. 154(b) by 766 days.

(21) Appl. No.: 12/786,742

(22) Filed: May 25, 2010

(65) Prior Publication Data

US 2011/0292702 A1    Dec. 1, 2011

(51) Int. Cl.
*H02M 3/335*        (2006.01)

(52) U.S. Cl.
CPC ........ *H02M 3/33592* (2013.01); *Y02B 70/1475* (2013.01); *Y02B 70/1433* (2013.01)
USPC ....................................................... 363/21.06

(58) Field of Classification Search
USPC .................................... 363/21.06, 21.14, 127
See application file for complete search history.

(56) References Cited

U.S. PATENT DOCUMENTS

| | | | | |
|---|---|---|---|---|
| 7,349,229 | B1 * | 3/2008 | Yang | 363/21.16 |
| 7,889,521 | B2 * | 2/2011 | Hsu | 363/21.14 |
| 2007/0076446 | A1 * | 4/2007 | Shiga et al. | 363/17 |
| 2007/0121352 | A1 * | 5/2007 | Yang et al. | 363/21.15 |
| 2007/0263421 | A1 * | 11/2007 | Kyono | 363/127 |
| 2008/0232018 | A1 * | 9/2008 | Yang et al. | 361/94 |
| 2009/0109715 | A1 * | 4/2009 | Yang et al. | 363/89 |
| 2009/0129125 | A1 * | 5/2009 | Yang | 363/21.14 |
| 2009/0213623 | A1 * | 8/2009 | Yang | 363/49 |
| 2009/0213628 | A1 * | 8/2009 | Yang et al. | 363/89 |
| 2009/0219003 | A1 * | 9/2009 | Yang | 323/283 |
| 2009/0285003 | A1 * | 11/2009 | Ishii | 363/127 |
| 2010/0014324 | A1 * | 1/2010 | Yang et al. | 363/21.06 |
| 2010/0172156 | A1 * | 7/2010 | Yang et al. | 363/21.02 |
| 2010/0201334 | A1 * | 8/2010 | Yang et al. | 323/284 |

* cited by examiner

*Primary Examiner* — Adolf Berhane
*Assistant Examiner* — Gustavo Rosario Benitez
(74) *Attorney, Agent, or Firm* — McClure, Qualey & Rodack, LLP (57) ABSTRACT

A synchronous rectifying circuit for a switching power converter is provided. The synchronous rectifying circuit includes a power transistor, a diode, and a control circuit. The power transistor and the diode are coupled to a transformer and an output of the power converter for rectification. The control circuit generates a drive signal to switch on the power transistor once the diode is forward biased. The control circuit includes a monitor circuit. The monitor circuit generates a monitor signal an off signal to switch off the power transistor in response to a pulse width of the drive signal for generating an off signal to switch off the power transistor. The monitor circuit further reduces the pulse width of the drive signal in response to a change of a feedback signal. The feedback signal is correlated to an output load of the power converter.

9 Claims, 10 Drawing Sheets

METHOD AND APPARATUS TO IMPROVE DYNAMIC RESPONSE OF THE SYNCHRONOUS RECTIFYING FOR RESONANT POWER CONVERTERS

BACKGROUND OF THE INVENTION

1. Field of the Invention

Figure 1:
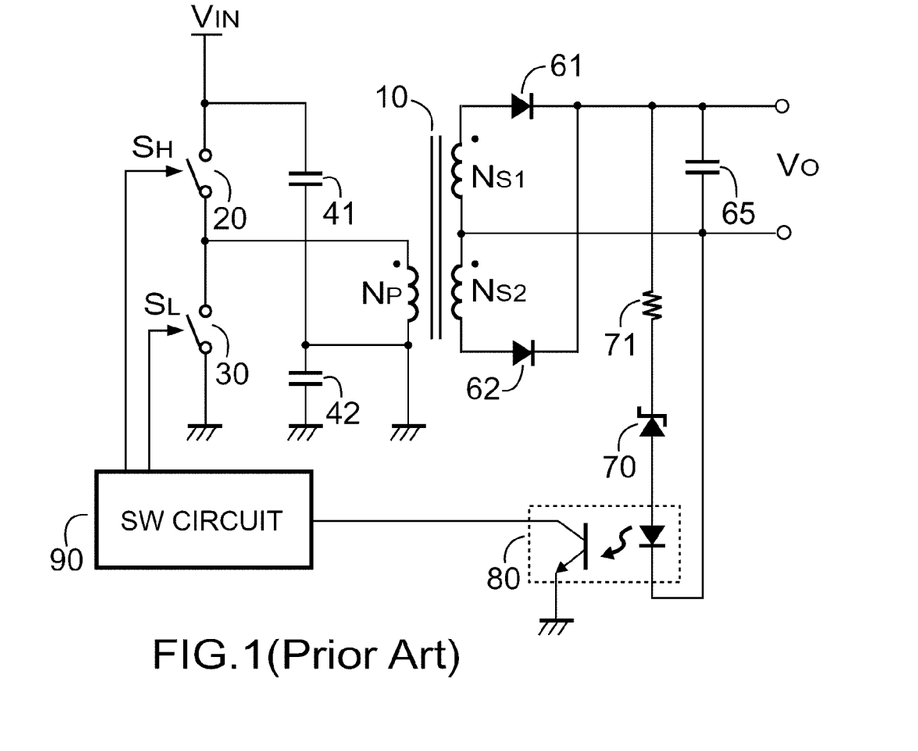
FIG. 1 shows a circuit schematic of a soft switching power converter.

The present invention relates to power converters, and more particularly, relates to synchronous rectifiers of power converters 2. Description of the Related Art FIG. 1 shows a circuit schematic of a soft switching power converter. It includes a transformer 10 to provide isolation from line input $V_{IN}$ to output $V_O$ of the power converter for safety. Switches 20 and 30 develop a half bridge circuit to switch the transformer 10. A switching circuit (SW CIRCUIT) 90 generates switching signals $S_H$ and $S_L$ for switching the switches 20 and 30 respectively. A leakage inductance of a primary winding $N_P$ of the transformer 10 and capacitors 41 and 42 form a resonant tank. The leakage inductance L and the equivalent capacitance C of capacitors 41 and 42 determine the resonance frequency $f_0$ of the resonant tank.

$$f_0 = \frac{1}{2\pi\sqrt{L \times C}} \quad (1)$$

The transformer 10 transfers the energy from the primary winding $N_P$ to secondary windings $N_{S1}$ and $N_{S2}$ of the transformer 10. Rectifiers 61 and 62 and a capacitor 65 perform the rectification and filtering for generating the output $V_O$. A voltage regulation device (such as a zener diode) 70, a resistor 71 and an optical coupler 80 form a regulation circuit coupled to the output $V_O$. The optical coupler 80 is further coupled to the switching circuit 90 for developing the feedback loop of the converter to regulate the output $V_O$. The switching circuit 90 generates the switching signals $S_H$ and $S_L$ in response to the feedback loop signal.

Although the soft switching power converter can achieve high efficiency and low EMI (electric-magnetic interference) performance, the forward voltage of rectifiers 61 and 62 still causes significant power losses. The object of present invention is to provide a synchronous rectifying circuit for switching a power converter to achieve higher efficiency.

BRIEF SUMMARY OF THE INVENTION

An exemplary embodiment of a synchronous rectifying circuit for a switching power converter is provided. The synchronous rectifying circuit comprises a power transistor, a diode, and a control circuit. The power transistor and the diode are coupled to a transformer and an output of the power converter for rectification. The control circuit generates a drive signal to switch on the power transistor once the diode is forward biased. The control circuit comprises a monitor circuit. The monitor circuit generates a monitor signal an off signal to switch off the power transistor in response to a pulse width of the drive signal for generating an off signal to switch off the power transistor. The monitor circuit further reduces the pulse width of the drive signal in response to a change of a feedback signal. The feedback signal is correlated to an output load of the power converter.

Another exemplary embodiment of a synchronous rectifying circuit for a switching power converter is provided. The synchronous rectifying circuit comprises a power transistor, a diode, and a control circuit. The power transistor and the diode are coupled to a transformer and an output of the power converter for rectification. The control circuit generates a drive signal to switch on the power transistor once the diode is forward biased. The control circuit comprises a debounce circuit. The debounce circuit generates a debounce signal to switch off the power transistor in response to a pulse width of the drive signal. The debounce circuit further reduces the pulse width of the drive signal in response to the drive signal.

An exemplary embodiment of a synchronous rectifying method for a switching power converter is provided. A power transistor and a diode coupled to a transformer and an output of the power converter for rectification. The method comprises the steps of generating a drive signal to switch on the power transistor once the diode is forward biased; generating a monitor signal in response to a pulse width of the drive signal for generating an off signal to switch off the power transistor; reducing the pulse width of the drive signal in response to a change of a feedback signal; and the feedback signal is correlated to an output load of the power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
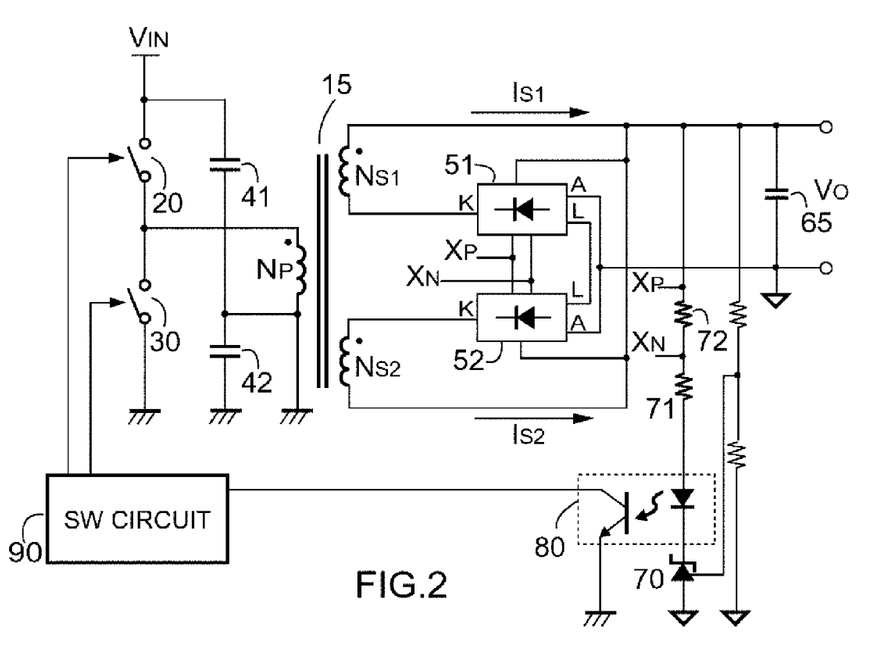
FIG. 2 shows a preferred embodiment of a resonant power converter according to the present invention.

FIG. 2 shows a resonant power converter with integrated synchronous rectifiers (synchronous rectifying circuits) according to the present invention. The power converter includes a transformer 15 having a primary winding $N_P$ and secondary windings $N_{S1}$ and $N_{S2}$. A leakage inductance of the primary winding $N_P$ of the transformer 15 and capacitors 41 and 42 form a resonant tank. The primary winding $N_P$ of the transformer 15 has two switches 20 and 30 for switching the primary winding $N_P$ of the transformer 15. A synchronous rectifying circuit 51 has a cathode terminal K connected to the secondary winding $N_{S1}$. An anode terminal A of the synchronous rectifying circuit 51 is connected to an output ground of the power converter. Another synchronous rectifying circuit 52 has a cathode terminal K connected to the secondary winding $N_{S2}$ and an anode terminal A also connected to the output ground of the power converter. A capacitor 65 performs a filtering operation for generating an output $V_O$.

The synchronous rectifying circuit 51 includes a first power transistor, a first diode, and a first control circuit. The synchronous rectifying circuit 52 includes a second power transistor, a second diode, and a second control circuit. The synchronous rectifying circuits 51 and 52 generate a lock signal L to prevent synchronous rectifying circuit 51 and 52 from turning on simultaneously. The lock signal L prevents the turned-on state of the second power transistor when the first diode or the first power transistor is turned on. The lock signal L prevents the turned-on state of the first power transistor when the second diode or the second power transistor is turned on. Furthermore, the synchronous rectifying circuits 51 and 52 have input terminals $X_P$ and $X_N$ coupled to a feedback loop to receive a feedback signal. A voltage regulation device (such as a zener diode) 70, resistors 71 and 72, and an optical coupler 80 form a regulation circuit to regulate the output $V_O$ of the power converter. The input terminals $X_P$ and $X_N$ are connected to the resistor 72.

Figure 3:
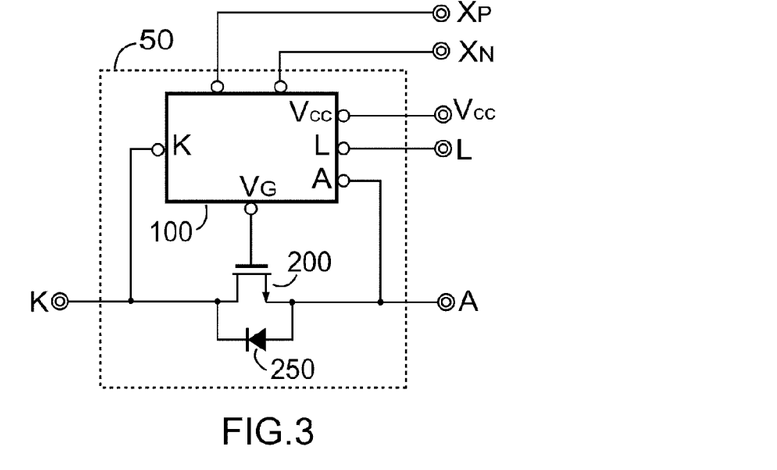
FIG. 3 shows a preferred embodiment of an integrated synchronous rectifier according to the present invention.

FIG. 3 shows a preferred embodiment of a synchronous rectifying circuit 50. It represents the circuit of the synchronous rectifying circuit 51 or 52. The synchronous rectifying circuit 50 includes a power transistor 200, a diode 250, and a control circuit 100. The control circuit 100 generates a drive signal $V_G$ to control the power transistor 200. The diode 250 is connected to the power transistor 200 in parallel. The diode 250 is a physical diode or a parasitic device of the power transistor 200. The power transistor 200 is connected between the cathode terminal K and the anode terminal A. The cathode terminal K is coupled to the secondary winding of the transformer 15. The anode terminal A is coupled to the output $V_O$ of the power converter. The control circuit 100 will generate an on signal to enable the drive signal $V_G$ and turn on the power transistor 200 once the diode 250 is forward biased. The control circuit 100 will generate an off signal to disable the drive signal $V_G$ and turn off the power transistor 200 in response the period of the on signal. A lock terminal outputs the lock signal L to show the on/off of the power transistor 200. The input terminals $X_P$ and $X_N$ are used for receiving the feedback signal.

Figure 4:
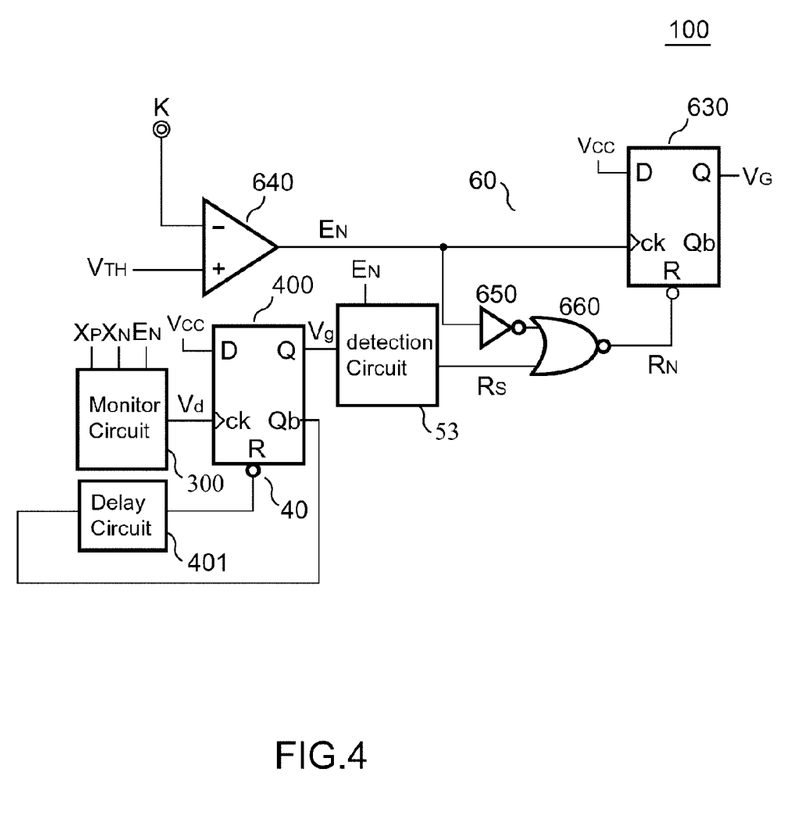
FIG. 4 shows a first preferred embodiment of a control circuit according to the present invention.

FIG. 4 shows a first preferred embodiment of the control circuit 100. It includes a monitor circuit 300, a latch circuit 40, a detection circuit 53, and a control circuit 60. Wherein the latch circuit 40 is developed by a flip-flop 400 and a delay circuit 401. The control circuit 60 is developed by a flip-flop 630, a comparator 640, an inverter 650, and a NOR gate 660. The comparator 640 has a threshold voltage $V_{TH}$ connected to its positive input. The negative input of the comparator 640 is coupled to the cathode terminal K. The output of comparator 640 generates the on signal $E_N$ to the clock-input terminal ("ck") of the flip-flop 630. Therefore, the drive signal $V_G$ can only be enabled once the on signal $E_N$ is enabled.

Through the inverter 650 and the NOR gate 660, a reset signal $R_N$ is coupled to the reset terminal ("R") of the flip-flop 630 for resetting the drive signal $V_G$. The reset terminal ("R") of the flip-flop 630 is controlled by an output of the NOR gate 660. The flip-flop 630 is operated as a latch circuit. The drive signal $V_G$ is generated at the output of the flip-flop 630 for controlling the power transistor 200.

The detection circuit 53 generates an off signal $R_S$ in response to a reset signal $V_g$. The reset signal $V_g$ is enabled in response to the turn on of a monitor signal $V_d$. The clock terminal "ck" of the flip-flop 400 is coupled to the monitor circuit 300. The monitor circuit 300 generates the monitor signal $V_d$ to enable the reset signal $V_g$ in response to the feedback signal on the input terminals $X_P$ and $X_N$ and the on signal $E_N$. The reset signal $V_g$ is reset by the output of the delay circuit 401.

The drive signal $V_G$ will be generated to turn on the power transistor 200 once the voltage of the cathode terminal K is lower than the threshold voltage $V_{TH}$ (the diode 250 is turned on). The drive signal $V_G$ is disabled while the on signal $E_N$ is disabled or the detection signal $R_S$ is enabled.

Figure 5:
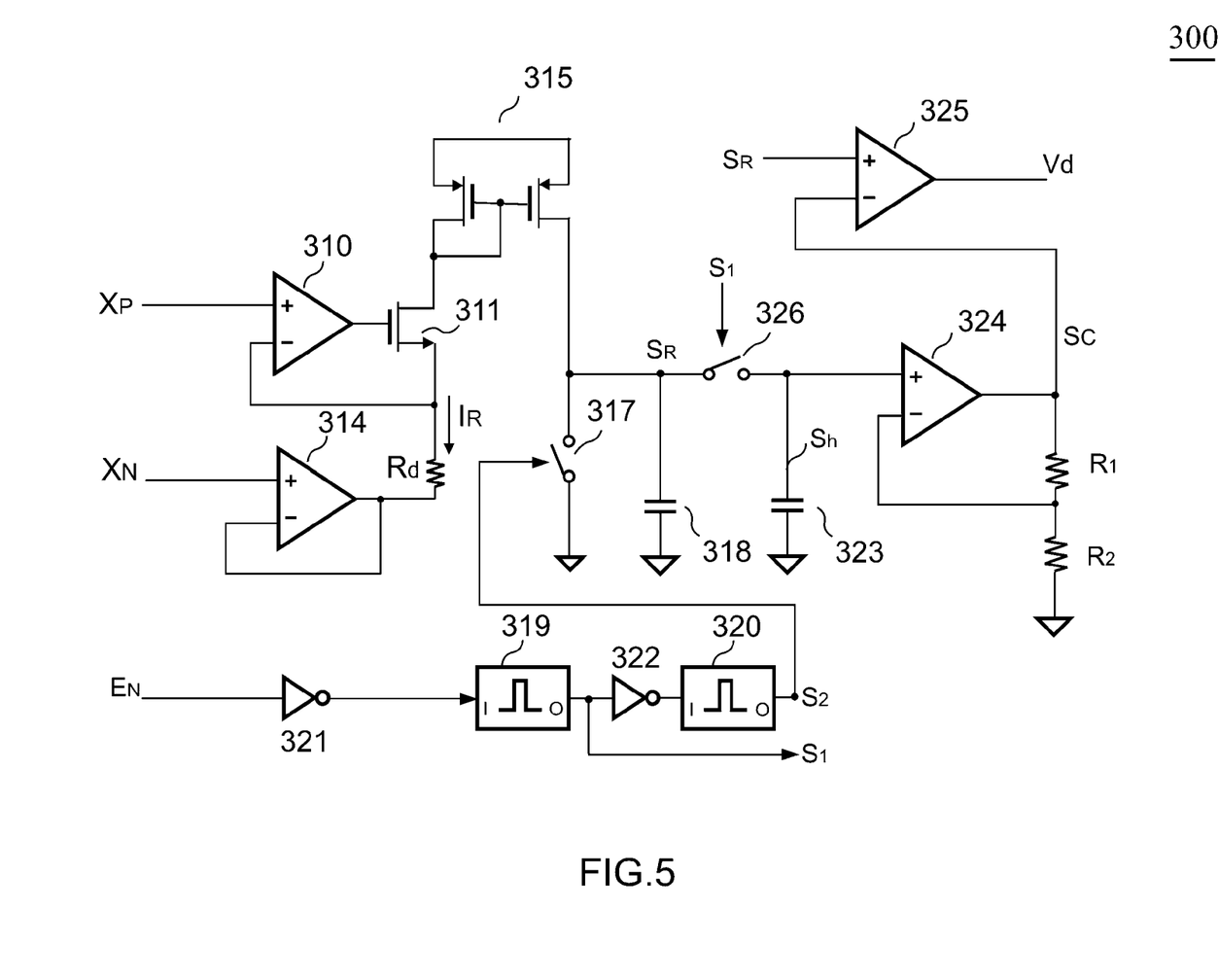
FIG. 5 shows a preferred embodiment of a monitor circuit according to the present invention.

FIG. 5 shows a preferred embodiment of the monitor circuit 300. Operational amplifiers 310 and 314, a transistor 311, and a resistor $R_d$ form a differential circuit. A differential current $I_R$ flowing through the resistor $R_d$ represents the differential voltage between the signals respectively on the input terminals $X_P$ and $X_N$. A current mirror 315, a switch 317, and a capacitor 318 form a charge circuit. A ramp signal $S_R$ is thus generated at the capacitor 318. The on signal $E_N$ is coupled to generate a sample signal $S_1$ and a clear signal $S_2$ through pulse generation circuits 319 and 320 and inverters 321 and 322. A switch 326 and a capacitor 323 form a sampling circuit. The sample signal $S_1$ is coupled to sample the signal of the capacitor 318 to the capacitor 323 through the switch 326. A hold signal $S_h$ is thus generated at the capacitor 323. After sampling, the clear signal $S_2$ is coupled to clear the capacitor 318 through the switch 317. The level of the hold signal $S_h$ is correlated to the enable period of the on signal $E_N$. The hold signal $S_h$ of the capacitor 323 is coupled to generate a threshold signal $S_C$ at an input terminal of a comparator 325 via a buffer amplifier 324 and resisters $R_1$, $R_2$. The level of the threshold signal $S_C$ can be represented as:

$$S_C = \frac{R_1 + R_2}{R_2} S_h$$

Another input terminal of the comparator 325 is coupled to receive the ramp signal $S_R$. The comparator 325 generates the monitor signal $V_d$ to turn on the reset signal $V_g$. The monitor signal $V_d$ is generated once the change of the differential voltage between the input signals $X_P$ and $X_N$ is large than $$\frac{R_1 + R_2}{R_2}.$$

Figure 6:
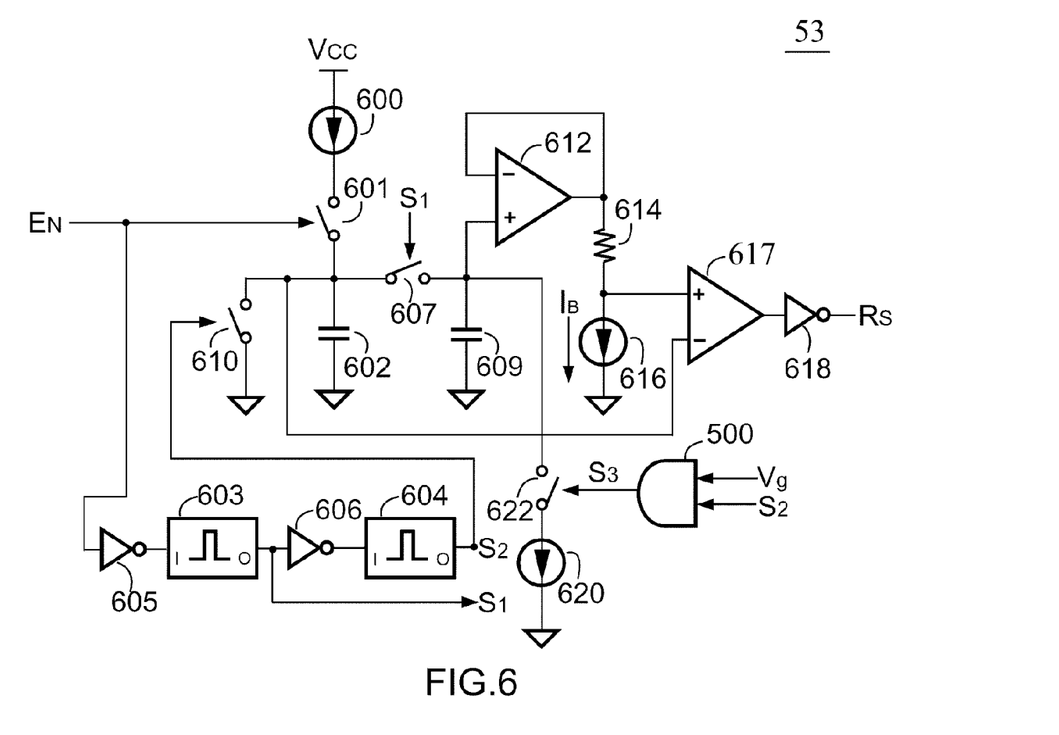
FIG. 6 shows a preferred embodiment of a detection circuit according to the present invention.

FIG. 6 shows a preferred embodiment of the detection circuit 53. A switch 601, a current source 600, and a capacitor 602 form a charge circuit. The on signal $E_N$ is coupled to enable the charge of the capacitor 602 through the switch 601 and the current source 600. A ramp signal is thus generated at the capacitor 602. The on signal $E_N$ is further coupled to generate a sample signal $S_1$ and a clear signal $S_2$ through pulse generation circuits 603 and 604 and inverters 605 and 606. A switch 607 and a capacitor 609 form a sampling circuit. The sample signal $S_1$ is coupled to sample the signal of the capacitor 602 to the capacitor 609 via the switch 607. A hold signal is thus generated in the capacitor 609. After the sampling, the clear signal $S_2$ is coupled to clear the capacitor 602 through a switch 610. The level of the hold signal of the capacitor 609 is correlated to the enable period of the on signal $E_N$. The hold signal of the capacitor 609 is coupled to an input terminal of a comparator 617 through a buffer amplifier 612 and a resistor 614. A current source 616 is further coupled to the resistor 614 to generate a voltage drop at the resistor 614. Another input terminal of the comparator 617 is coupled to receive the ramp signal. The output terminal of the comparator 617 is connected to an inverter 618. The inverter 618 generates the off signal $R_S$ to disable the drive signal $V_G$. The current $I_B$ of the current source 616 is adjusted to generate the off signal $R_S$. The pulse width of the drive signal $V_G$ is thus shorter than the turn-on period of the diode 250.

Figure 7:
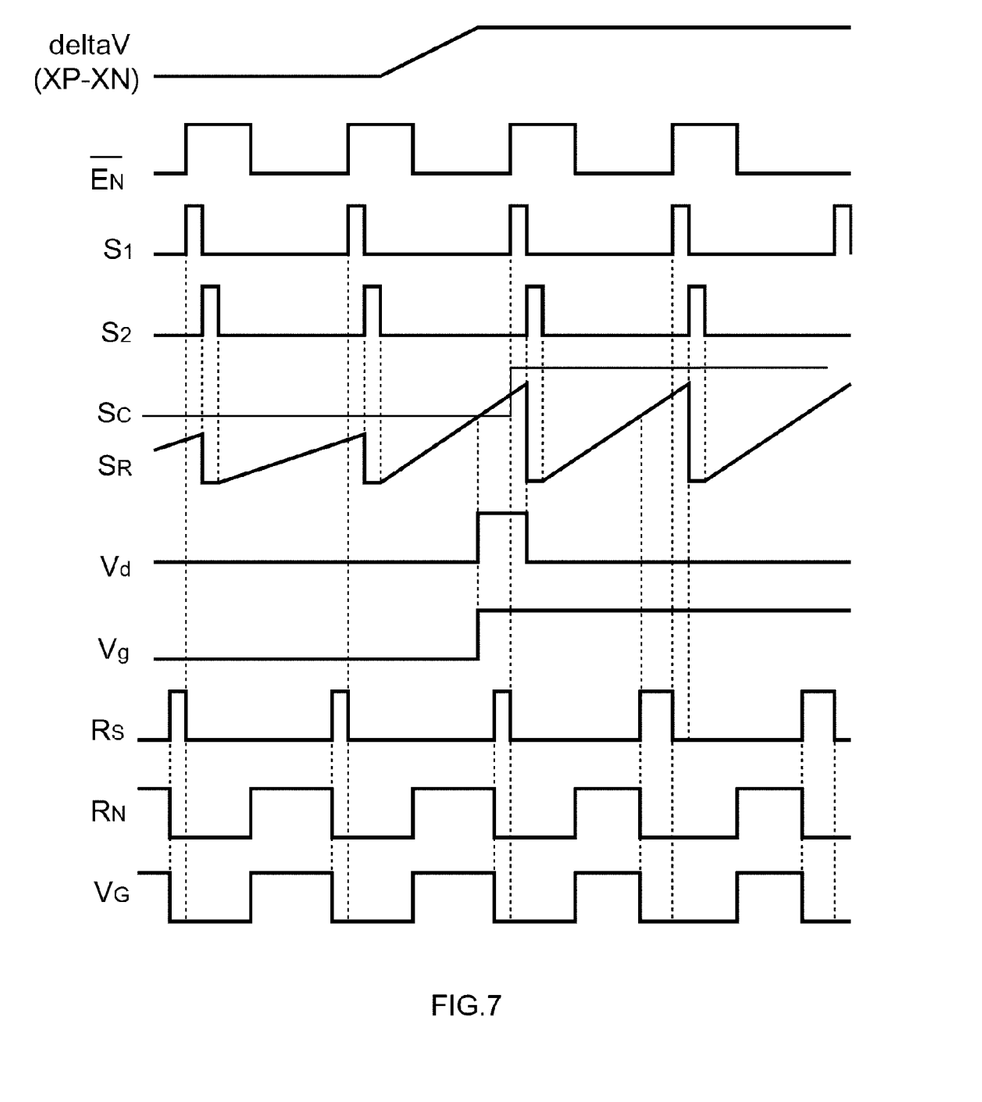
FIG. 7 shows key waveforms of the synchronous rectifying circuit with the first preferred embodiment of the control circuit.

A current source 620 is coupled to discharge the capacitor 609 and decrease the level of the hold signal via a switch 622. A detector (AND gate) 500 receives the reset signal $V_g$ which is enabled by the monitor signal $V_d$ in response of the input signals respectively on the input terminals $X_P$ and $X_N$. Thus, the detector 500 generates a restart signal $S_3$ to enable the switch 622 for the discharge in response to the feedback signal on the input terminals $X_P$ and $X_N$. The detector 500 is utilized to reduce the pulse width of the drive signal $V_G$ when change of the feedback signal is over a threshold shown in FIG. 5. The pulse width of the drive signal $V_G$ will be reduced when the output $V_O$ has a feedback signal change over a threshold. The monitor circuit 300 generates the monitor signal $V_d$ to enable the reset signal $V_g$ in response of the input signals respectively on the input terminals $X_P$ and $X_N$ FIG. 7 shows key waveforms of the synchronous rectifying circuit. Referring to FIG. 4, FIG. 5, and FIG. 6, when the delta V ($X_P$–$X_N$) differential voltage between the signals respectively on the input terminals $X_P$ and $X_N$ changes over a threshold (for example, $$\frac{R_1 + R_2}{R_2}),$$

the monitor signal $V_d$ is enabled, and the reset signal $V_g$ is thus turned on via the flip-flop 400. The off signal $R_S$ is thus turn on earlier, and the turn on period of the drive signal $V_G$ is thus shorter.

Figure 8:
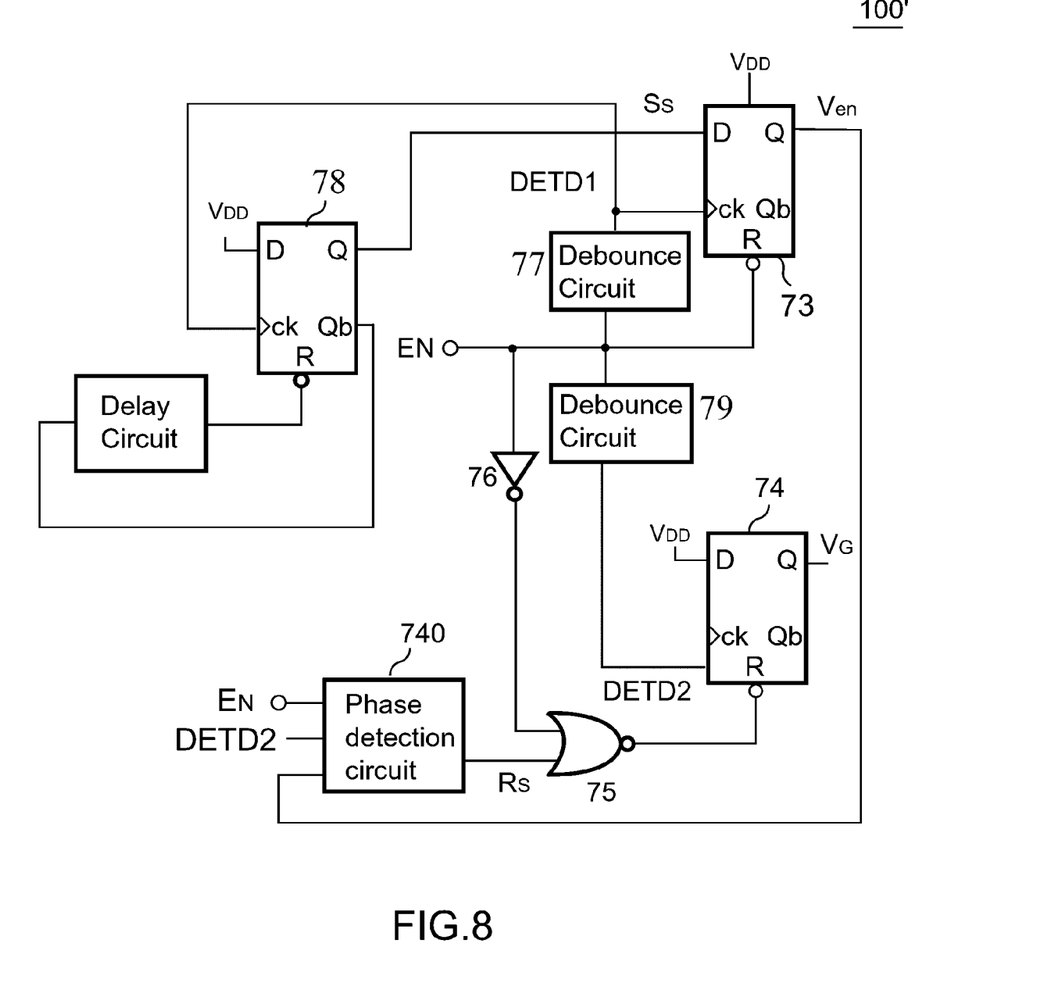
FIG. 8 shows a second preferred embodiment of a control circuit according to the present invention.

FIG. 8 shows a second preferred embodiment of the control circuit 100'. The control circuit 100' comprises a latch circuit 78, two debounce circuits 77 and 79, flip-flops 73 and 74, and a phase detection circuit 740. The on signal $E_N$ is coupled to enable the debounce circuit 77 and 79. Debounce signals DETD1, DETD2 are thus generated to the clock input terminals CK of the flip-flops 73 and 74. The debounce signal DETD1 is further coupled to the clock input terminal CK to turn on the latch circuit 78. The latch circuit 78 generates the start signal Ss to the flip-flop 73. The flip-flop 73 generates a shrink signal $V_{en}$ to the phase detection circuit 740. The phase detection circuit 740 generates the off signal $R_S$ in response to the on signal $E_N$. The flip-flop 74 generates the drive signal $V_G$. The off signal $R_S$ is coupled to reset the drive signal $V_G$ through a NOR gate 75 and the flip-flop 74, and the on signal $E_N$ is also further coupled to reset the drive signal $V_G$ through an inverter 76, the NOR gate 75 and the flip-flop 74.

Figure 9:
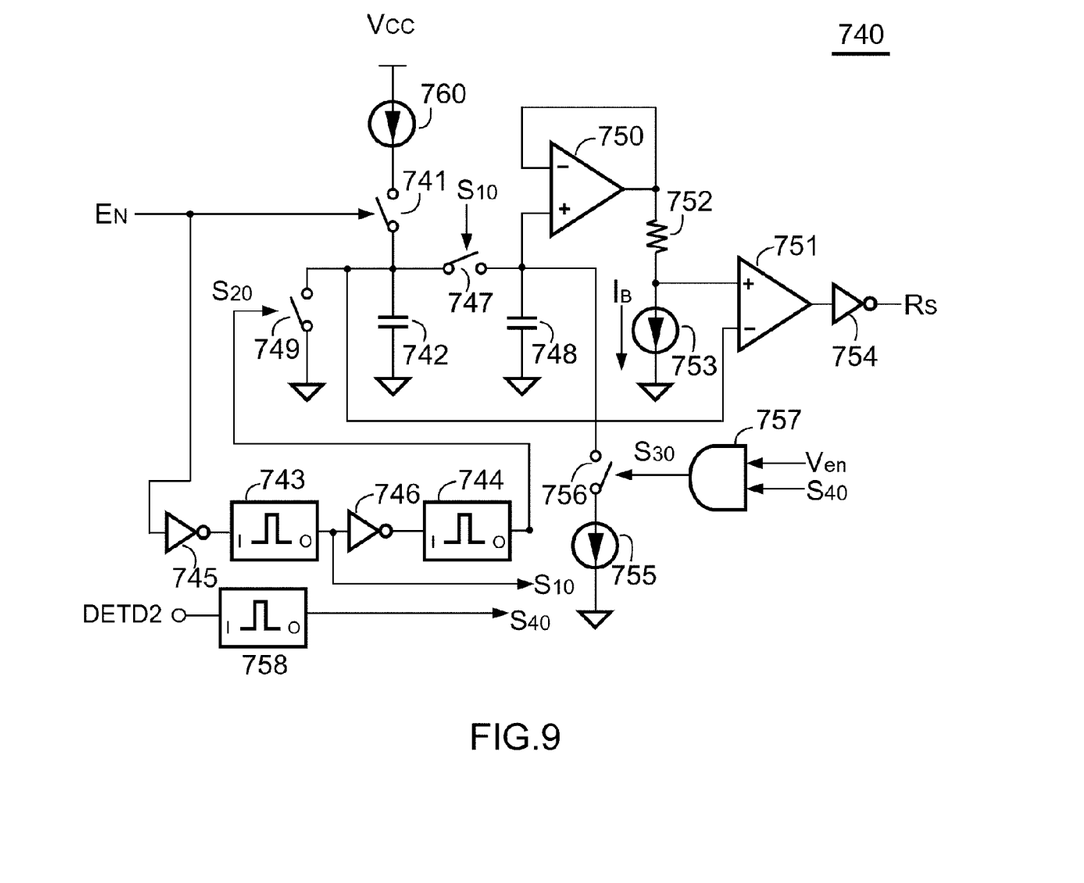
FIG. 9 shows a preferred embodiment of a phase detection circuit according to the present invention.

FIG. 9 shows a preferred embodiment of the phase detection circuit 740. A switch 741, a current source 760, and a capacitor 742 form a charge circuit. The on signal $E_N$ is coupled to enable the charge of the capacitor 742 through the switch 741 and the current source 760. A ramp signal is thus generated at the capacitor 742. The on signal $E_N$ is further coupled to generate a sample signal $S_{10}$ and a clear signal $S_{20}$ through pulse generation circuits 743 and 744 and inverter 745 and 746. A switch 747 and a capacitor 748 form a sampling circuit. The sample signal $S_{10}$ is coupled to sample the signal of the capacitor 742 to the capacitor 748 via the switch 747. A hold signal is thus generated in the capacitor 748. After the sampling, the clear signal $S_{20}$ is coupled to clear the capacitor 742 through a switch 749. The level of the hold signal of the capacitor 748 is correlated to the enable period of the on signal $E_N$. The hold signal of the capacitor 748 is coupled to an input terminal of a comparator 751 through a buffer amplifier 750 and a resistor 752. A current source 753 is further coupled to the resistor 752 to generate a voltage drop at the resistor 752. Another input terminal of the comparator 751 is coupled to receive the ramp signal. The output terminal of the comparator 751 is connected to an inverter 754. The inverter 754 generates the off signal $R_S$ to disable the drive signal $V_G$. The current $I_B$ of the current source 753 is adjusted to generate the off signal $R_S$. The pulse width of the drive signal $V_G$ is thus shorter than the turn-on period of the diode 250.

A current source 755 is coupled to discharge the capacitor 748 and decrease the level of the hold signal via a switch 756. A detector (AND gate) 757 generates a restart signal $S_{30}$ to enable the switch 756 for the discharge in response to the shrink signal $V_{en}$ and a pulse signal $S_{40}$. The pulse signal $S_{40}$ is generated in accordance to the debounce signal DETD2 through a pulse generation circuit 758.

Figure 10:
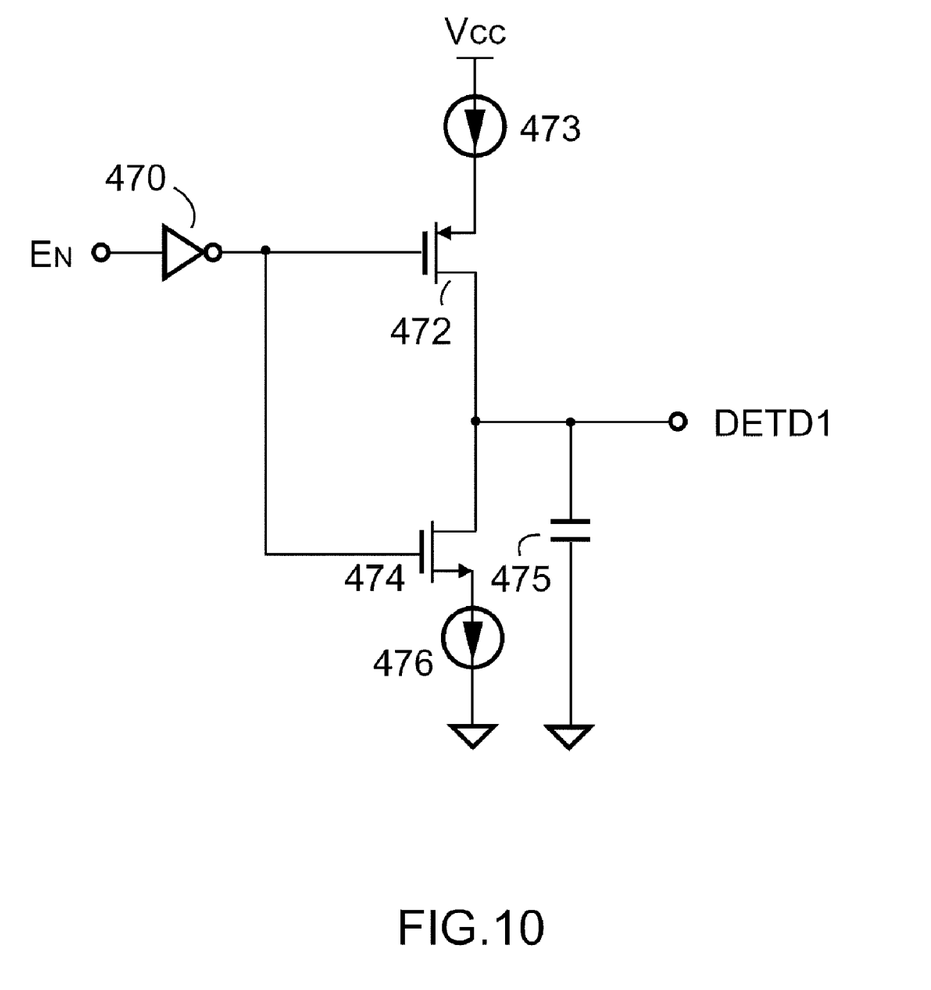
FIG. 10 shows a preferred embodiment of a debounce circuit according to the present invention.

FIG. 10 shows a preferred embodiment of the debounce circuit. Referring to FIG. 10, gates of a PMOS transistor 472 and an NMOS transistor 474 receive the on signal $E_N$ through an inverter 470. A current source 473 is coupled between the voltage source $V_{CC}$ and a source of the PMOS transistor 472, while a current source 476 is coupled between a source of the NMOS transistor 474 and a ground. A capacitor 475 has a first terminal coupled to the joint between drains of the transistors 472 and 474 and a second terminal coupled to the ground. The debounce signal (for example debounce signal DETD1) is generated at the joint.

Figure 11:
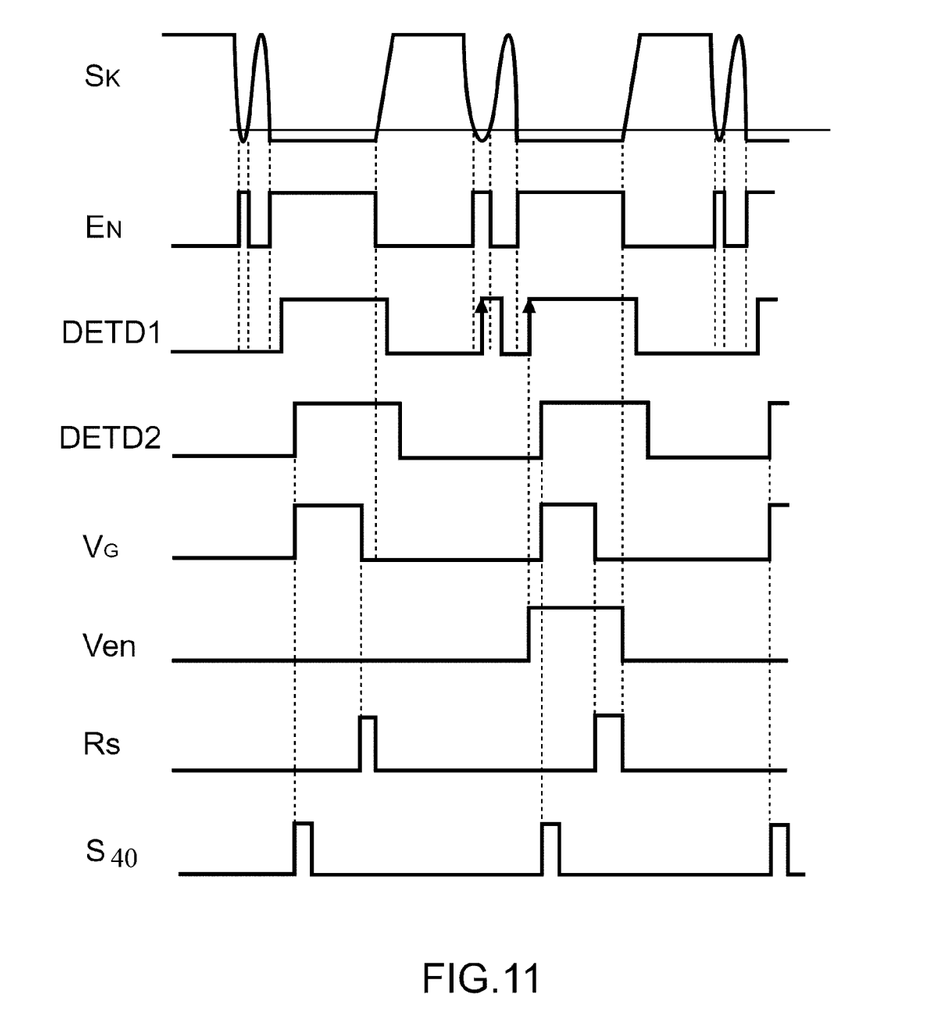
FIG. 11 shows key waveforms of the synchronous rectifying circuit with the second preferred embodiment of the control circuit.

FIG. 11 shows key waveforms of the synchronous rectifying circuit. Referring to FIGS. 8, 9, and 10, a swing pulse $S_W$ will generate when a signal $S_K$ on the K terminal turns from high level to low level, and the on signal $E_N$ will be enabled accordingly. When the turn on period larger than a predetermined pulse width, the debounce signal DETD1 is turned on. The shrink signal $V_{en}$ is thus enabled. According to the enabled pulse signal $S_{400}$, the pulse width of the off signal $R_S$ will be shorter in the period to avoid over lapping.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectifying circuit for a switching power converter comprises:
   a power transistor and a diode coupled to a transformer and an output of the power converter for rectification; and a control circuit generating a drive signal to switch on the power transistor once the diode is forward biased, wherein the control circuit comprises:
   a monitor circuit generating a monitor signal in response to a pulse width of the drive signal for generating an off signal to switch off the power transistor;
   wherein the monitor circuit generates a threshold and further enables the monitor signal when a change of a feedback signal is over the threshold to reduce the pulse width of the drive signal; and wherein the feedback signal is correlated to an output load of the power converter; and wherein the monitor circuit comprises: a charge circuit generating a ramp signal when the drive signal is enabled; a sample circuit generating a hold signal in accordance with the level of the ramp signal; an amplifier generating a threshold signal in accordance with the level of the hold signal; and a comparator generating the monitor signal in response to comparison of the ramp signal and the threshold signal; wherein the level of the hold signal is correlated to the level of the feedback signal.

2. The synchronous rectifying circuit as claimed in claim 1, wherein the control circuit further comprises a detection circuit, wherein the detection circuit comprises:

a charge circuit generating a ramp signal when the drive signal is enabled by an on signal;

a sample circuit generating a hold signal in accordance with the level of the ramp signal; and a comparator generating the off signal in response to comparison of the ramp signal and the hold signal;

wherein the level of the hold signal is correlated to the pulse width of the on signal.

3. The synchronous rectifying circuit as claimed in claim 2, wherein the detection circuit further comprises:

a detector generating a restart signal coupled to decrease the level of the hold signal;

wherein the restart signal is generated when the change of the feedback signal is over the threshold.

4. A synchronous rectifying circuit for a switching power converter comprises:

a power transistor and a diode coupled to a transformer and an output of the power converter for rectification; and a control circuit generating a drive signal to switch on the power transistor once the diode is forward biased, wherein the control circuit comprises:

a debounce circuit generating a debounce signal according to an on signal to switch off the power transistor;

wherein when a turn on period of the on signal is larger than a predetermined period, the debounce circuit turns on the debounce signal to reduce the pulse width of the drive signal; and wherein the debounce circuit comprises:

an inverter receiving the on signal;

a PMOS transistor, wherein a gate of the PMOS transistor receives the on signal through the inverter;

an NMOS transistor, wherein a gate of the NMOS transistor receives the on signal through the inverter; a first current source coupled between a voltage source and a source of the PMOS transistor;

a second current source coupled between a source of the NMOS transistor and a ground; and a capacitor having a first terminal coupled a joint between drains of the PMOS transistor and the NMOS transistor and a second terminal coupled to the ground;

wherein the debounce signal is generated at the joint between the drains of the PMOS transistor and the NMOS transistor.

5. The synchronous rectifying circuit as claimed in claim 4, wherein the control circuit further comprises a phase detection circuit, wherein the detection circuit comprises:

a charge circuit generating a ramp signal when the drive signal is enabled by the on signal;

a sample circuit generating a hold signal in accordance with the level of the ramp signal; and a comparator generating an off signal in response to comparison of the ramp signal and the hold signal for switch off the power transistor;

wherein the level of the hold signal is correlated to the pulse width of the on signal.

6. The synchronous rectifying circuit as claimed in claim 5, wherein the phase detection circuit further comprises:

a detector generating a restart signal coupled to decrease the level of the hold signal; and wherein the restart signal is generated in response to a shrink signal and a pulse signal.

7. A synchronous rectifying method for a switching power converter, wherein a power transistor and a diode coupled to a transformer and an output of the power converter for rectification, the method comprises:

generating a drive signal to switch on the power transistor once the diode is forward biased;

generating a monitor signal in response to a pulse width of the drive signal for generating an off signal to switch off the power transistor; generating a threshold; and when a change of a feedback signal is over the threshold, enabling the monitor signal to reduce the pulse width of the drive signal;

wherein the feedback signal is correlated to an output load of the power converter;

wherein the step of generating the monitor signal comprises:

generating a ramp signal when the drive signal is enabled; generating a hold signal in accordance with the level of the ramp signal; generating a threshold signal in accordance with the level of the hold signal; and generating the monitor signal in response to comparison of the ramp signal and the threshold signal; wherein the level of the hold signal is correlated to the level of the feedback signal.

8. The method as claimed in claim 7 further comprising:

generating a ramp signal when the drive signal is enabled by an on signal;

generating a hold signal in accordance with the level of the ramp signal; and generating the off signal in response to comparison of the ramp signal and the hold signal;

wherein the level of the hold signal is correlated to the pulse width of the on signal.

9. The method as claimed in claim 8 further comprising:

generating a restart signal to decrease the level of the hold signal when the change of the feedback signal is over the threshold.

* * * * *